Nov. 4, 1969  A. J. CUSSEN  3,476,914

TEMPERATURE CONTROL ARRANGEMENT

Filed May 15, 1967  2 Sheets-Sheet 1

INVENTOR.
ARTUR J. CUSSEN
BY
Don Finkelstein
ATTORNEY

United States Patent Office 3,476,914
Patented Nov. 4, 1969

3,476,914
TEMPERATURE CONTROL ARRANGEMENT
Arthur J. Cussen, Santa Barbara County, Calif., assignor to Electro-Optical Industries, Inc., a corporation of California
Filed May 15, 1967, Ser. No. 646,439
Int. Cl. H05b 1/02
U.S. Cl. 219—499                                   25 Claims

ABSTRACT OF THE DISCLOSURE

An improved temperature control arrangement in which an electrical resistance heater is utilized in a balanced bridge circuit and serves the function of both a heater and a thermometer. Controls are provided for controlling the electrical energy flow to the electrical resistance heater in response to its measured resistance value thereby to control the temperature of a body to which the resistance heater is in heat transfer relationship. Another branch of the balanced bridge circuit is utilized to provide a variable resistance and thereby allow a predetermined temperature to be achieved by the resistance heater when the bridge comes into balance.

BACKGROUND OF THE INVENTION

Field of the invention

This invention relates to the temperature control art and more particularly to an improved arrangement for controlling the temperature of a body by utilizing an electrical resistance heater as both a heater and a resistance thermometer.

Description of the prior art

In many applications, such as, for example, infrared generation, measurement, calibration, control and testing arrangements, it is often desired to provide a source of electromagnetic radiation wherein the source of electromagnetic radiation is maintained at a substantially constant temperature in order to achieve a known electromagnetic radiation output distribution both as to intensity and spectral content. Such units are often called black bodies and generally emit electromagnetic radiation in a predetermined and well known characteristic pattern, depending upon the temperature thereof.

Additionally, in many other applications, it is desired to maintain the temperature of a body at a predetermined value for a given period of time and also, in the same system, to have the capability for varying the predetermined temperature value from one value to another within a limited range as may be desired.

Prior art applications have often included a balanced bridge circuit, one branch of which was a resistance thermometer and this bridge circuit controlled the electrical power to an electrical resistance heater, such as an electrical resistance coil in intimate heat transfer relationship to the body whose temperature is to be controlled. In such arrangements, there is often a high power loss in the bridge circuit for controlling the amount of energy flowing to the heater, depending upon the setting of the resistance thermometer. Further, the utilization of a separate coil for the resistance heater and for the resistance thermometer not only required a duplication of parts, but also, in certain applications, could not provide as accurate a temperature measurement and control as could be desired.

SUMMARY OF THE INVENTION

Accordingly, it is an object of applicant's invention herein to provide an improved temperature control arrangement.

It is another object of applicant's invention herein to provide an electrical resistance heater that is utilized to serve a dual function of both a heater and a resistance thermometer.

It is yet another object of applicant's invention herein to provide an electrical resistance heater-thermometer for accurately controlling the temperature of a body.

The above and other objects are met, in accordance with one embodiment of applicant's invention, by providing an electrical resistance heater, which, in some applications of applicant's invention, may be in the form of a wound coil of platinum wire in intimate heat transfer relationship to the body whose temperature is to be controlled. In this embodiment of applicant's invention, the resistance heater, that is, the coil of platinum wire, serves the function of both a resistance heater and a resistance thermometer in the sense that measurements of its resistance are made to compare it to a known setting and determine the amount of power necessary to be applied to the resistance heater-thermometer in order to raise resistance to a predetermined value.

The resistance heater-thermometer is one leg of a balanced bridge means, which may be referred to as a bridge means, and a variable resistor is an adjacent leg of the bridge means and each of the variable resistor and the resistance heater-thermometer have first ends connected together.

A first and second fixed resistor are provided and the first resistor has a first end connected to the second end of the resistance heater thermometer and the second resistor has a first end connected to the second end of the variable resistor, and the first and the second fixed resistors have their second ends connected together.

A source of electrical energy which, in this embodiment of applicant's invention, may comprise a source of DC electrical energy, such as a battery, has a negative terminal connected to the common junction of the variable resistor and electrical resistance heater-thermometer in the bridge circuit.

A DC differential amplifier having a first input connected to the second end of the electrical resistance heater-thermometer and a second input connected to the second end of the variable resistor is provided with an output terminal connected to a current control means such as a NPN transistor, in which the base electrode thereof is connected to the output terminal of the differential direct current amplifier.

The positive terminal of the source of electrical energy is connected to the collector electrode of the transistor and the emitter electrode of the transistor is connected to the common junction of the first and the second fixed resistors.

In accordance with well known balanced bridge techniques, the DC differential amplifier measures the difference between the voltages existing on the two nodes of the balanced bridge means and for the condition of the resistance of the electrical resistance heater-thermometer being too low to provide a balanced bridge circuit for a given setting of the variable resistor, there is a voltage amplified through the differential direct current amplifier to turn on the transistor allowing current to flow from the source of electrical energy through the bridge and thereby heating the electrical resistance heater-thermometer until the bridge is in balance which indicates that the electrical heater-thermometer has achieved a predetermined value for a given setting of the variable resistor.

In the preferred embodiment of applicant's invention, the electrical resistance heater-thermometer is selected so that within its normal operating temperature range, the resistance thereof is very much greater than the resistance of the first fixed resistor and, similarly, for the normal operating range of the electrical resistance heater-thermometer, the variable resistor at any resistance value within the range is very much greater than the resistance of the electrical resistance heater-thermometer. When so connected in the bridge circuit as described above, then the second fixed resistor, in order to satisfy the bridge conditions, is very much greater than the first fixed resistor. This combination assures that the electrical heater resistance thermometer consumes most of the power applied to the bridge.

In other embodiments of applicant's invention, a shunt resistor may be connected between the collector electrode and emitter electrode of the transistor to allow a shunt path for biasing the bridge when the transistor is turned off due to a balanced or low temperature bridge condition. The current flowing therethrough also helps to make up losses in the system and thereby provides a steady state value of the temperature of the electrical resistance heater-thermometer.

In other embodiments of applicant's invention, alternating current may be utilized to power the electrical resistance heater-thermometer, and other embodiments of applicant's invention, combinations of alternating current and direct current may be utilized variously for control signal and power signal connections.

BRIEF DESCRIPTION OF THE DRAWING

The above and other embodiments of applicant's invention may be more readily understood from the following detailed description, taken together with the accompanying drawing, wherein similar reference characters refer to similar elements throughout and in which.

DESCRIPTION OF THE PREFERRED EMBODIMENTS

Figure 1:
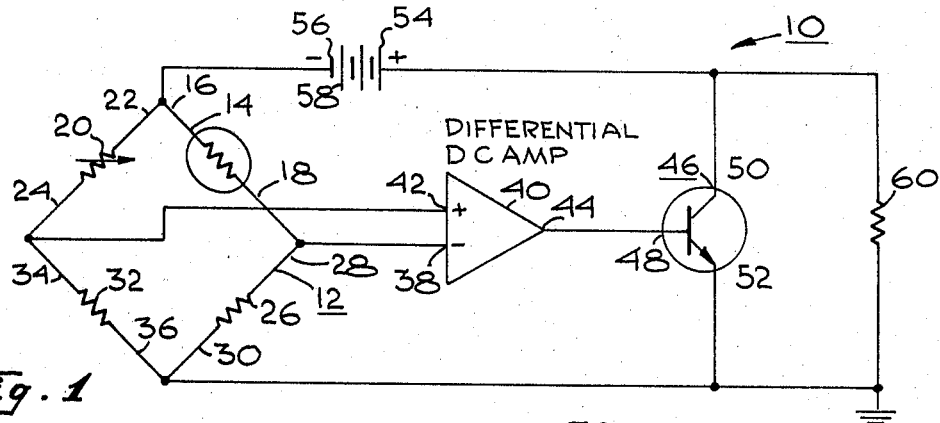
FIGURE 1 is a schematic diagram illustrating one embodiment of applicant's invention.

Referring now to FIGURE 1, there is shown a schematic diagram illustrating one embodiment of applicant's invention, generally designated 10.

As shown on FIGURE 1, there is provided a bridge circuit designated 12, having for one leg thereof an electrical resistance heater 14. The electrical resistance heater 14, in applicant's invention herein, serves the dual function of being both a resistance heater and a resistance thermometer. For example, the electrical resistance heater may be in the form of a coil of platinum wire wound in intimate heat transfer relationship to a body, such as a black body electromagnetic radiation emitter (not shown) and the control of the temperature of the electrical resistance heater 14 thereby controls the temperature of the black body.

Electrical resistance heater 14 has a first end 16 and a second end 18.

A variable resistor which, in this embodiment of applicant's invention, may be manually variable to provide a variable resistance in the balanced bridge 12 to allow a predetermined temperature setting for the electrical resistance heater 14 is provided as an adjacent leg of the bridge 12 and has a first end 22 connected to the first end 16 of the electrical resistance heater 14, and a second end 24. To complete the bridge 12, there is provided a first fixed resistor 26, having a first end 28 connected to the second end 18 of the electrical resistance heater 14, and a second end 30. A second fixed resistor 32 is also provided and it has a first end 34 connected to a second end 24 of the variable resistor 20 and a second end 36 connected to the second end 30 of the first fixed resistor 26.

A detection means such as differential DC amplifier 40 is provided to measure the difference in voltage in the two branches of the bridge 12. Accordingly, the negative input terminal 38 of the differential DC amplifier 40 is connected to the second end 18 of the electrical resistance heater 14 and the second or positive input terminal 42 of the differential DC amplifier 40 is connected to the second end 24 of the variable resistor 20.

A control means 46, such as a transistor having a base electrode 48, a collector electrode 50 and an emitter electrode 52, is provided to control the flow of electrical energy to the bridge 12. The output terminal 44 of the differential DC amplifier 40 is connected to the base terminal 48 of the transistor 46 to control the transistor 46 and turn the transistor 46 on and off, depending upon the signal provided at the output from the DC differential amplifier 40.

A source of electrical energy which, in this embodiment of applicant's invention, is a source of direct current electrical energy, such as the battery 54, is provided and has a negative terminal 56 connected to the common junction comprising the first end 16 of the electrical resistance heater 14 and first end 22 of the variable resistor 20, and a positive terminal 58 connected to the collector electrode 50 of the transistor 46. The emitter electrode 52 of the transistor 46 is connected to the second end 30 of the first fixed resistor 26 and second end 36 of the second fixed resistor 32, and this connection may, as shown on FIGURE 1, be ground.

In accordance with well known balanced bridge techniques, when the ratio of the resistance of the electrical resistance heater 14 to the first fixed resistor 26 is the same as the ratio of the resistance of the variable resistor 20 to the second fixed resistor 32, then the bridge is in balance, the same voltage exists at both nodes of the bridge 12 and there is no differential DC amplifier 40 output signal at the output terminal 44. Consequently, the transistor 46 is turned off and no current flows from the battery 54 to the bridge means 12. Thus, the bridge is in balance and the electrical resistance heater 14 is at a temperature sufficient to satisfy the above ration which is determined by the setting of the variable resistor 20.

However, in the event that the temperature of the electrical resistance heater 14 drops below the value necessary to provide the balanced condition, then the temperature is below that set by the variable resistor 20 and there is an unbalance in the bridge 12. For this condition, there is a greater voltage at the first input terminal 38 of the differential DC amplifier 40 than at the second terminal 42 thereof and consequently, there is an amplified signal provided at the output terminal 44 of the differential DC amplifier 40 to turn on the transistor 46. When the transistor 46 is turned on, electrical energy is allowed to flow from the battery 54 to the bridge means 12 and this electrical energy heats the electrical resistance heater 14 and, as the temperature thereof rises, the resistance thereof also rises until the abovementioned balanced condition is reached and then the transistor 46 ceases to conduct and the flow of electrical energy to the bridge means 12 is terminated.

In many applications, it may be desired to provide a shunt impedance, such as shunt resistor 60 connected across the collector electrode 50 and emitter electrode 52 of the transistor 46 to provide a shunt path to bias the bridge when the transistor is off. The energy flowing therethrough from the battery 54 to the bridge 12 under the conditions of the differential DC amplifier providing no output to the transistor 46 in which case the transistor 46 is off, additionally allows for losses in the system or body that is heated by the electrical resistance heater 14.

Thus, to obtain a particular temperature in a body that is in intimate heat transfer relationship to the electrical resistance heater 14, the predetermined temperature may be set by adjusting the value of the variable resistor 20 which, for convenience, may be calibrated in temperature graduations rather than resistance graduations. The above-mentioned phenomena then takes place until a balanced bridge 12 is achieved and the electrical resistance heater 14 is then at the predetermined temperature determined by the variable resistor 20.

In this embodiment of applicant's invention, as well as in all the other embodiments of applicant's invention described hereinafter, it is desired to minimize the amount of power that is dissipated in the fixed resistors 26 and 32 and the variable resistor 20. Accordingly, it is desired that the value of the resistances within the range of temperatures that the electrical resistance heater 14 will operate be very much greater than the value of the resistance of the first fixed resistor 26 and, also, the value of the resistances within the anticipated operating range of the variable resistor 20 should be very much greater than the value of the resistances within the estimated operating temperature range of the electrical resistance heater 14. Therefore, this provides that the value of the resistance of the second fixed resistance 32 is very much greater than the value of the resistance of the first fixed resistor 26. By providing these relationships, the power that is dissipated and lost in the balanced bridge 12, other than in the resistance heater 14, tends to be minimized.

In the event that the temperature of the electric resistance heater 14 is greater than that which would provide a resistance to balance the bridge 12, as determined by the temperature setting of the variable resistor 20, then it is apparent that the voltage at the second input terminal 42 of the differential DC amplifier 40 is greater than the voltage at the first terminal 38 thereof. Consequently, since the second terminal 42 is positive, the transistor 46 is not turned on and there is no electrical energy allowed to flow from the battery 54 to the balanced bridge 12. Normal radiation, conduction and/or convection losses from the electric resistance heater 14 or the body in intimate contact therewith to be heated thereby lowers the temperature and consequently lowers the resistance of the electric resistance heater 14 until the balanced condition is reached. Further cooling of the electric resistance heater 14 then lowers the resistance below that value that will balance the bridge 12 as determined by the temperature setting of the variable resistor 20 and, consequently, a signal will be applied to the base electrode 48 of the transistor 46 to turn on the transistor and allow the flow of electrical energy from the battery 54 to the bridge means 12.

Thus, it is apparent, that the unique utilization of the electric resistance 14 as both a heater and a thermometer, which may be termed a self-heating thermometer, or heater-thermometer, allows an accurate control of the temperature of the body to which the heater is in intimate heat transfer relationship. The commonality of heater and thermometer also precludes temperature overshoot.

In many temperature measuring applications, it is desirable to provide a true null balance for the condition at the bridge circuit 12 in balance. That is, the detection means receives no signal from the bridge circuit 12. However, as noted above, energy losses do occur in the circuitry and those losses must be compensated if the bridge circuit 12 is to remain in balance. Therefore, an error signal sufficient to make up for these losses must be provided even though the bridge is balanced and there is no signal at the detection means.

Figure 1A:
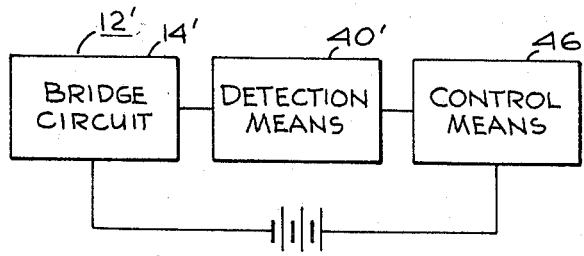
FIGURE 1a is a block diagram illustrating another embodiment of applicant's invention.

FIGURE 1a illustrates an embodiment of applicant's invention for providing a true null balance. As shown thereon, the detection means comprises a differential integrator 40' for receiving the signal from a bridge circuit 12' and transmitting a signal to the control means 46' in response thereto. The bridge circuit 12' and control means 46' may be similar, respectively, to the bridge circuit 12 and control means 46 described above. However, when the bridge circuit 12' is balanced and the signal to the differential integrator 40' is zero, the differential integrator 40' provides an error signal having a magnitude sufficient to make up for energy losses. Thus, the differential integrator provides a true null balance and allows operation at a fixed temperature in the leg 14', which may be an electrical heater-resistance thermometer similar to leg 14 described above, independently of external environmental conditions.

In the above-described embodiment of applicant's invention shown in FIGURE 1, it can be seen that direct current electrical energy was utilized for both the power source to provide the energy for heating the electric resistance heater 14 as well as for the appropriate signals through the differential amplifier 40 and transistor 46 to control the temperature to which the electric resistance heater 14 is heated. In other embodiments of applicant's invention, however, alternating current may be utilized for both providing the power and providing at least part of the control signal.

Figure 2:
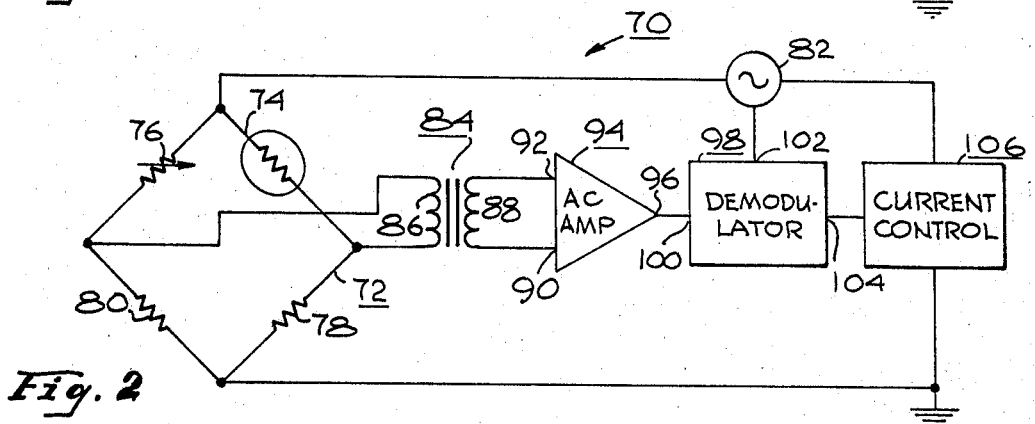
FIGURE 2 is a schematic diagram illustrating another embodiment of applicant's invention.

FIGURE 2 illustrates such an embodiment of applicant's invention.

As shown on FIGURE 2, there is an embodiment of applicant's invention, generally designated 70, having a balanced bridge means circuit 72 which may be identical to the balanced bridge circuit 12 shown on FIGURE 1, and may be comprised of an electric resistance heater 74, similar to the electric resistance heater 14, a variable resistor 76, which may be similar to the variable resistor 20 and utilized for the same purpose of determining the temperature setting of the electric resistance heater 74, a first fixed resistor 78 and a second fixed resistor 80. The values of the resistances of the electric resistance heater 74, the variable resistor 76, the first fixed resistor 78 and the second fixed resistor 80 may be as described above in connection with the discussion of the invention illustrated in FIGURE 1 hereof.

In the embodiment shown on FIGURE 2, there is provided a source of electrical energy which, in this embodiment, may be a source of alternating current electrical energy 82 for providing both power to heat the electric resistance heater 74, as well as for control signals, as described below.

A transformer 84, having a primary winding 86 that is connected to the common junction between the variable resistor 76 and the second fixed resistor 80 and the common junction between the electric resistance heater 74 and the first fixed resistor 78 is provided, and the secondary winding 88 of the transformer 84 is connected to the input terminals 90 and 92 of an alternating current amplifier 94. Thus, the AC amplifier 94 amplifies a signal that is proportional to the difference in the voltages on the two nodes of the balanced bridge means 72, the first branch comprising the electric resistance heater 74 and first fixed resistor 78 and the second branch comprising the variable resistor 76 and second fixed resistor 80 and provides an amplified signal proportional thereto at the output terminal 96 thereof.

A phase-sensitive demodulator 98 is provided and receives the signal from the alternating current amplifier 94 at the input terminal 100 thereof and also receives a reference signal at a reference signal input terminal 102 to provide an output signal and at output terminal 104 that is applied to a current control device 106. The current control device 106 may, if desired, be a transistor similar to the transistor 46, but, in those embodiments of applicant's invention wherein an alternating current source of power 82 is utilized to power the balanced bridge means 72, it is preferred that the current control means 106 be a saturable reactor, a saturable transformer, or a phase-controlled silicon controlled rectifier device.

The demodulator 98 provides a control signal to the current control means 106 that turns on the current control means 106 to allow the flow of alternating current electrical energy from the source of alternating current electrical energy 82 to the balanced bridge means 72 for the condition that the temperature and consequently the resistance of the electric resistance heater 74 is less than the value necessary to balance the bridge means 72 for the particular resistance setting and consequently, temperature setting, of the variable resistor 76. The demodulator provides the signal of proper polarity depending on the phase relationship of the signal applied to the input terminal 100 compared with the phase of the signal applied at the reference signal terminal 102 and having a magnitude proportional to the magnitude of the signal at the input terminal 100. Thus, for the above-described condition where the temperature and consequently, resistance of the electric resistance heater 74, is less than that required to balance the bridge means 72, the current control means 106 is turned on and electrical energy flows from the source of alternating current electrical energy 82 to the balanced bridge means 72 until the temperature and, consequently, the resistance of the electric resistance heater 74 rises to a value sufficient to balance the bridge means 72.

The demodulator 98 may, if desired, also be adjusted to provide that even for the condition of the bridge 72 balanced, a small output signal at the output terminal 104 of proper polarity to turn on the current control device 106 may be provided to allow enough heating of the electric resistance heater 74 to make up for radiation conduction and/or convection losses therefrom or from the body to be heated thereby and thus provide a steady state temperature in the electric resistance heater 74. If the temperature of the electric resistance heater 74 were to rise to a value greater than that indicated by the variable resistor 76, then the opposite polarity signal to the demodulator 98 increasing in magnitude overcomes the small loss signal that may be applied.

Alternatively, an appropriate AC shunt impedance may be utilized in this, as in the other AC embodiments of applicant's invention herein, in a manner similar to the utilization of the shunt impedance such as the shunt resistor 60 shown in FIGURE 1, as part of the current control 106 to provide the desired leakage current flow to the heater thermometer 74 at the balanced condition of the bridge 72 to make up for the losses, as described above.

Figure 3:
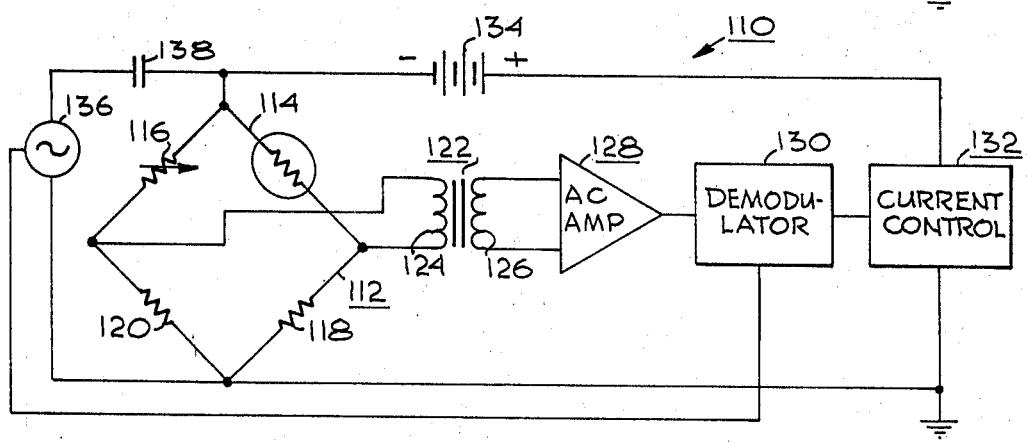
FIGURE 3 is a schematic diagram illustrating another embodiment of applicant's invention.
Figure 4:
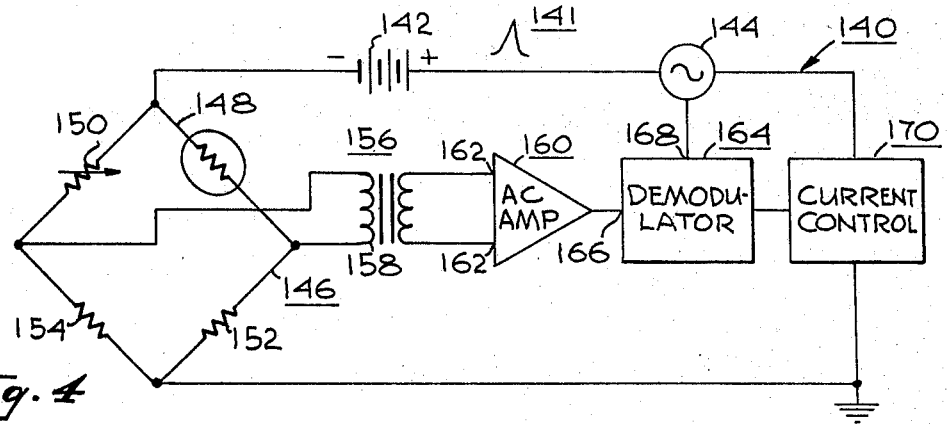
FIGURE 4 is a schematic diagram illustrating another embodiment of applicant's invention.

Applicant's invention herein may also be utilized in arrangements wherein there is provided a direct current source of electrical energy for applying power to the balanced bridge to heat the electric resistance heater and an alternating current source of electrical energy for providing the control signal. This embodiment of applicant's invention is illustrated in FIGURES 3 and 4. In FIGURE 3 there is shown a shunt connected arrangement, and in FIGURE 4 there is shown a series connected arrangement.

As shown on FIGURE 3, there is a shunt connected embodiment of applicant's invention, generally designated 110, which is provided with a balanced bridge bridge means 112 which may, for example, be identical to the balanced bridge means 12 illustrated on FIGURE 1 and comprise an electric resistance heater 114, which may be identical to the electrical resistance heater 14, a variable resistor 116, which may be identical to the variable resistor 20, a first fixed resistor 118 and a second fixed resistor 120, which may be equivalent, respectively, to the first resistor 26 and second fixed resistor 32 shown on FIGURE 1. The values between the resistances of the electric resistance heater 114, the variable resistor 116, the first fixed resistor 118 and the second fixed resistor 120 may be as described above.

A transformer 122, which may be identical to the transformer 84 shown on FIGURE 2, is provided and similarly has a primary winding 124 connected to the common junction between the electric resistance heater 114 and first fixed resistor 118 and the common junction between the variable resistor 116 and second fixed resistor 120. The secondary winding 126 of the transformer 122 is connected to the input terminals of an alternating current amplifier 128 which, for example, may be identical to the alternating current amplifier 94 shown on FIGURE 2. A demodulator 130 is provided to receive the output signal from the alternating current amplifier 128. The demodulator 130 may be identical to the demodulator 98 shown in FIGURE 2.

A current control device that is controlled by the output signal from the demodulator 130 is provided and is connected to a source of direct current electrical energy such as the battery 134 and the common junction between the first fixed resistor 118 and second fixed resistor 120 to allow the flow of direct current electrical energy from the battery 134 to the balanced bridge means 112 upon receipt of the appropriate signal from the demodulator 130. The current control means 132 may, for example, be a transistor similar to transistor 46 shown in FIGURE 1 or it may be a saturable reactor or a saturable transformer, or similar such control devices.

A second source of electrical energy is provided in the embodiment shown on FIGURE 3 and the second source of electrical energy may be a source of alternating current electrical energy 136 that is connected to the common junction between the electric resistance heater 114 and variable resistor 116 and the common junction between the first fixed resistor 118 and second fixed resistor 120 in the balanced bridge means 112. The source of alternating current electrical energy 136 also provides a reference signal to the demodulator 130 for phase relationship comparison with the signal received by the demodulator 130 from the alternating current amplifier 128. A capacitor 138 may also be provided to isolate the alternating current provided by the source of alternating current 136 from the source of direct current electrical energy 134.

The alternating current electrical energy provided to the balanced bridge 112 by the source of alternating current electrical energy 136 is utilized to generate the control signal for controlling the current control device 132. It provides this signal in a manner similar to that described in FIGURE 2 in that the transformer 122 applies an input signal to the AC amplifier 128 proportional to the difference between the magnitude of the signal at one node of the balanced bridge 112 comprising the electrical resistance heater 114 and first fixed resistor 118 and at the second node of the balanced bridge means 112 comprised of the variable resistor 116 and second fixed resistor 120. The AC amplifier provides a signal proportional thereto to the demodulator 130 which also, as noted above, receives a reference signal from the source of alternating current electrical energy 136 and provides an output signal for control of the current control means 132, having a polarity depending upon the phase of the input signal from the AC amplifier 128 relative to the reference signal from the source of alternating current electrical energy 136 and a magnitude proportional to the magnitude of the input signal from the alternating current amplifier 128. Thus, the current control means 132 is controlled by the signal provided by the demodulator 130 and appropriately allows the flow of electrical energy from the battery 134 to the bridge means 112 to heat the electrical resistance heater 114 for the condition that the electrical resistance heater 114 is at a temperature and correspondingly at a resistance less than that necessary to balance the bridge as determined by the setting of the variable resistor 116. When the temperature and, consequently, the resistance of the electrical resistance heater 114 rises to a value sufficient to balance the bridge means 112 for the given setting of the variable resistor 116, the demodulator may be adjusted to provide a small signal from the source of direct current electrical energy, such as the battery 134 to the balanced bridge means 112 to make up for losses in energy from the electric resistance heater 114 as described above.

In the arrangement shown on FIGURE 4, generally designated 140, the source of electrical energy is comprised as in the arrangement shown on FIGURE 3, of a source of direct current electrical energy such as a battery 142 which may be similar to the battery 54 and battery 134 described above and a source of alternating current electrical energy 144 which, if desired, may be similar to the source of alternating current electrical energy 136 and 82 described above. In this embodiment of applicant's invention shown on FIGURE 4, the battery 142 and source of alternating current electrical energy 144 are connected in series.

A balanced bridge means 146 which, if desired, may be identical to the balanced bridge means 112 shown in FIGURE 3, is provided and is comprised of an electrical resistance heater 148 which may be similar to the electrical resistance heater 14, a variable resistance 150 which, for example, may be similar to the variable resistor 20, a first fixed resistor 152 and a second fixed resistor 154 which, for example, may be similar to the first fixed resistor 26 and second fixed resistor 32, respectively, described above.

A transformer means 156 having a primary winding 158 connected to the common junction between the electrical resistance heater 148 and the first fixed resistor 152 and the common junction between the variable resistor 150 and second fixed resistor 154 to provide a signal at the alternating current amplifier 160 input terminals 162 proportional to the difference in voltage at the two nodes of the balanced bridge means 156.

The values of the resistances in the balanced bridge 146 may be selected in a manner described above in connection with the description of applicant's invention shown in FIGURE 1.

A demodulator 164 is provided to receive the output signal from the AC amplifier at its input terminal 166, as well as a reference signal from the source of alternating current electrical energy 144 at a reference signal terminal 168 and provides an output signal having a polarity determined by the relative phase between the input signal from the alternating current amplifier 160 and the reference signal from the source of alternating current electrical energy 144 and a magnitude proportional to the magnitude of the input signal from the alternating current amplifier 160. This output signal from the demodulator 164 is applied to a current control means 170 which, for example, may be a transistor such as the transistor 46 shown in FIGURE 1, a saturable reactor or a saturable transformer, or some other similar type current control means. The current control means is connected to the source of alternating current electrical energy 144 and to the common junction between the first fixed resistor 152 and second fixed resistor 154 of the balanced bridge means 146. The source of direct current electrical energy 142 is connected to the common junction between the electrical resistance heater 148 and variable resistance 150 and, as noted above, is connected in series with the source of alternating current electrical energy 144.

Thus, this series connection of the first source of electrical energy comprising the source of direct current electrical energy 142 and the second source of electrical energy comprising the source of alternating current electrical energy 144 provides a direct current power for the bridge means 146 to heat the electric resistance 148 that has a small AC ripple superimpressed thereon and the small AC ripple on the DC power signal is utilized to provide the control signal to the current control means 170.

When the electric resistance heater 148 is at a temperature and, consequently has a resistance value less than that necessary to balance the bridge means 146 for the particular setting of the variable resistor 150, a signal of the correct polarity and proportional to the magnitude of the difference between the voltages at the two nodes of the balanced bridge means 146 is provided to turn on the current control means 170 and allow the flow of electrical energy from the source of electrical energy 141 comprising the battery 142 and the source of alternating current electrical energy 144 to the bridge means 146 to heat the electric resistance 148.

The demodulator 164 may, if desired, be adjusted so that even when the electric resistance heater 148 is at a temperature and consequently a resistance necessary to balance the balanced bridge means 146 for the particular setting of the variable resistor 150, a small magnitude, appropriate polarity signal is sent to the current control means 170 from the demodulator 164 to allow a small flow of electrical energy to the bridge means 146 to heat the electric resistance 148 to make up for the losses that may be incurred in order to provide a steady state temperature and consequently steady state resistance in the electric resistance heater 148.

Figure 5:
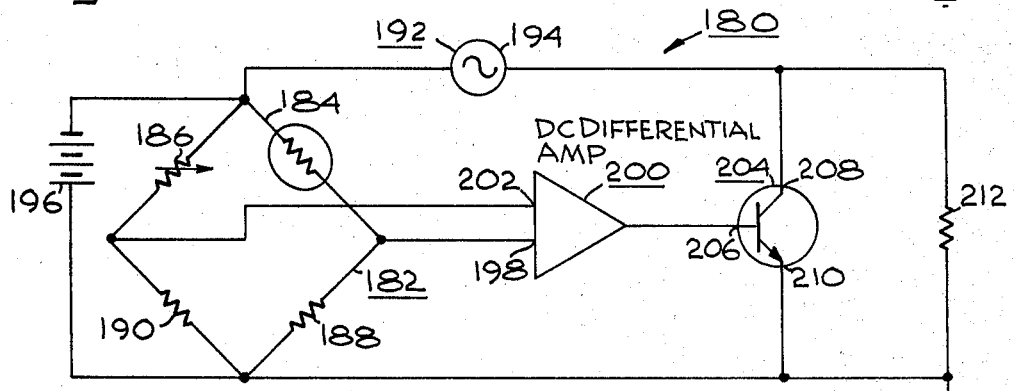
FIGURE 5 is a schematic diagram illustrating another embodiment of applicant's invention.
Figure 6:
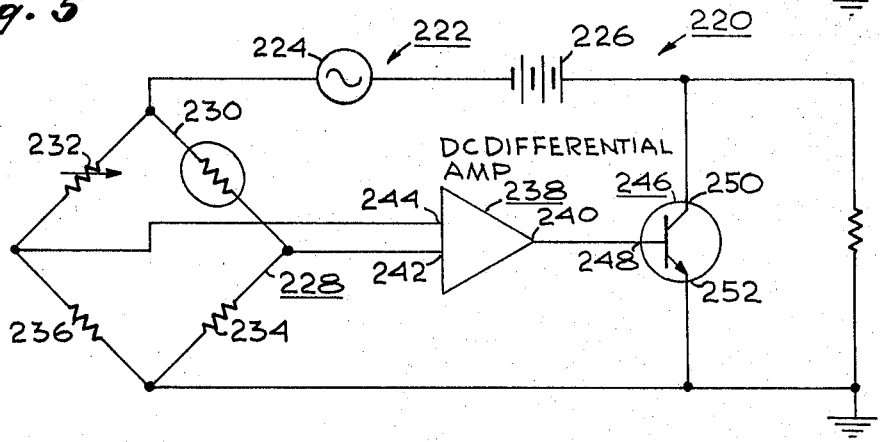
FIGURE 6 is a schematic diagram illustrating yet another embodiment of applicant's invention.

Applicant's invention may also be utilized wherein there is provided alternating current electrical energy for heating the electric resistance heater and direct current electrical energy for providing the appropriate control signals. This embodiment of applicant's invention is illustrated in FIGURES 5 and 6, wherein in FIGURE 5 there is shown a shunt connected arrangement, and in FIGURE 6 a series connected arrangement. In the embodiment of applicant's invention shown in FIGURE 5, generally designated 180, there is provided a balanced bridge means 182, which may be similar to the balanced bridge means 12 described above, and comprised of an electric resistance heater 184, a variable resistor 186, a first fixed resistor 188 and a second fixed resistor 190, and the resistance values of the components of the balanced bridge means 182 may be selected in the manner described above in connection with the description of applicant's invention shown in FIGURE 1.

A source of electrical energy 192 in this embodiment is comprised of a first source of electrical energy comprising a source of alternating current electrical energy 194 and a second source of electrical energy comprising a source of direct current electrical energy such as the battery 196. The battery 196 is connected between the common junction between the electric resistance heater 184 and variable resistor 186 and the common junction between the first fixed resistor 188 and second fixed resistor 190 to provide a DC control signal having a magnitude proportional to the difference between the magnitude of the signal at the first node of the balanced bridge means 182, comprising the electric resistance heater 184 and first fixed resistor 188 through a first terminal 198 on a DC differential amplifier 200 and the signal at the second node of the balanced bridge means 182 comprised of the variable resistor 186 and second fixed resistor 190 at the second input terminal 202 of the DC differential amplifier 200.

A current control means, such as a transistor 204, having base electrode terminal 206, collector electrode terminal 208 and emitter electrode terminal 210, has the collector electrode 208 connected to the source of alternating current electrical energy 194 and the emitter electrode 210 connected to the common junction between the first fixed resistor 188 and second fixed resistor 190 and controls the flow of electrical energy from the source of alternating current electrical energy 194 to the balanced bridge means 182 in response to the signals received at the base electrode terminal 206 from the DC differential amplifier 200, in a manner similar to that described above in connection with applicant's invention shown in FIGURE 1.

A shunt resistor 212 may also be provided connected between the collector electrode terminal 208 and emitter electrode terminal 210 of the transistor 204 to provide a shunt path to the balanced bridge means 182, so that a small electric current flows therethrough to heat the electric resistance heater 184 even though the electric resistance heater 184 may be at the appropriate temperature and consequently the resistance necessary to balance the bridge means 182 for the particular setting of the variable resistor 186 to make up for losses that may be incurred therefrom.

Thus, in the arrangement of applicant's invention shown in FIGURE 5 and generally designated 180, there is provided alternating current electrical energy for heating electric resistance heater 184 and direct current electrical energy for providing the appropriate control signals for controlling the flow of the alternating current electrical energy and this is in a shunt connected configuration.

In FIGURE 6, on the other hand, there is shown an embodiment of applicant's invention, generally designated 220, wherein the source of electrical energy designated 222 is comprised of a first source of electrical energy comprising a source of alternating current electrical energy 224 and a second source of electrical energy comprising a source of direct current electrical energy 226, which may be, respectively, similar to the first and second sources of electrical energy 194 and 196 described above in connection with the embodiment shown in FIGURE 5. In this embodiment of applicant's invention in FIGURE 6, designated 220, the first and second sources of electrical energy are connected in series.

The embodiment designated 220 is also provided with a balanced bridge means 228 which, for example, may be similar to the balanced bridge means 182 and is comprised of an electric resistance heater 230 which may be similar to the electric resistance heater 184, a variable resistor 232 which, for example, may be similar to the variable resistor 186, a first fixed resistor 234 and a second fixed resistor 236 which, for example, may be similar, respectively, to the first and second fixed resistors 188 and 190. A differential DC amplifier 238 which may be similar to the direct current differential amplifier 200 is provided to generate an amplified signal at its output 240 proportional to the magnitude of the difference between the signal at a first node of the balanced bridge means 228 comprised of the electric resistance heater 230 and first fixed resistor 234 as applied to a first input terminal 242 of the DC differential amplifier 238 and the signal at a second node of the balanced bridge 228 comprised of the variable resistor 232 and second fixed resistor 236 as applied to the second input terminal 244 of the DC differential amplifier 238.

A current control means, such as a transistor 246, which, for example, may be similar to the transistor 46 shown in FIGURE 1, is provided and has a base electrode terminal 248 that receives the information signal from the DC differential amplifier, a collector electrode terminal 250 that is connected to the source of direct current electrical energy 226 and an emitter electrode terminal 252 that is connected to the common junction between the first fixed resistor 234 and second fixed resistor 236 of the balanced bridge means 228. The source of alternating current electrical energy 224 is connected to the common junction between the electrical resistance heater 230 and the variable resistor 232 and to the source of direct current electrical energy 226.

In accordance with the tecniques described above, the control signal from the DC differential amplifier that is applied to the current control means 246 controls the flow of electrical energy from the source of electrical energy 222 to the bridge means 228 that applies power to heat the electric resistance heater 230. As noted above, in this arrangement of applicant's invention shown in FIGURE 6, the alternating current from the source of alternating current electrical energy 224 is utilized to heat the electric resistance heater 230 and the direct current from the source of direct current electrical energy 226 provides the appropriate control signal so that the signal provided to the bridge 228 is an alternating current signal having a direct current displacement.

It will be appreciated that many of the combinations of structural elements comprising applicant's invention herein may be interchanged between the embodiment's described above. For example, the above described differential integrator, while shown in FIGURE 1a, could equally well be utilized in other embodiments as the detection means to provide the true null balance with error signal for loss compensation.

From the above, it can be seen that applicant has provided an improved arrangement for controlling the temperature of an electric resistance heater. Several different embodiments of applicant's invention have been described in which the electrical resistance heater provides the dual function of both an electric resistance heater and a thermometer, and, in a sense, may be termed a self-heating thermometer.

Those skilled in the art may find many variations and adaptations of applicant's invention described herein. Therefore, the appended claims are intended to cover all such variations and adaptations falling within the true scope and spirit of applicant's invention.

I claim:
1. A temperature control arrangement for controlling the temperature of a body comprising, in combination:
   an electric resistance heater means, having a predetermined variation of electrical resistance with temperature, and defining a first leg of a bridge means, and said electrical resistance heater means also comprising a resistance thermometer means and positionable in heat transfer relationship to the temperature control body for intimate thermal energy exchange therewith to maintain said electric resistance heater means at substantially the same temperature as the temperature control body and said electrical resistance means responsive to changes in the temperature of the temperature control body;
   a variable electrical resistor means defining a second leg of said bridge means and adjacent said heater means and having a first end thereof connected to a first end of said heater means for establishing a preselected resistance of said electrical resistance heater means to provide a corresponding preselected temperature of said electric resistance heater means and the temperature control body;
   a first fixed resistor defining a third leg of said bridge means and having a first end connected to the second end of said heater means;
   a second fixed resistor defining a fourth leg of said bridge means and having a first end connected to the second end of said variable resistor and a second end connected to the second end of said first fixed resistor;
   a source of electrical energy for supplying electrical energy to said bridge means to heat said heater means;
   detection means connected to said bridge means for detecting the balance condition of said bridge means and providing an output signal having a magnitude proportional thereto;
   control means connected to said output of said detection means, said source of electrical energy and said bridge means for controlling the flow of electrical energy from said source means to said bridge means in response to the magnitude of said output signal from said detection means; and
   means for providing a predetermined electrical energy flow from said source means to said bridge means for said bridge means in a balanced condition.

2. The arrangement defined in claim 1 and further comprising:
   a shunt resistor means connected in parallel with said control means and between said source means and said bridge means for biasing said bridge means to allow a predetermined flow of electrical energy from said source means to said bridge means for said bridge means in a balanced condition.

3. The arrangement defined in claim 1, wherein:
the resistances of said electric resistance heater means within a predetermined temperature range thereof is very much greater than the resistance of said first fixed resistor;
the resistances of said variable resistor within a predetermined resistance variation is very much greater than the resistances of said electric resistance heater means within a predetermined temperature range thereof; and
said second fixed resistor has a resistance very much greater than said first fixed resistor.

4. The arrangement defined in claim 2, wherein:
the resistances of said electric resistance heater means within a predetermined temperature range thereof is very much greater than the resistance of said first fixed resistor;
the resistances of said variable resistor within a predetermined resistance variation is very much greater than the resistances of said electric resistance heater means within a predetermined temperature range thereof; and
said second fixed resistor has a resistance very much greater than said first fixed resistor.

5. The arrangement defined in claim 1, wherein:
said source of electrical energy comprises a source of direct current electrical energy having a negative terminal connected to said first end of said electrical resistance heater means;
said detection means comprises a direct current differential amplifier having a negative input connected to the second end of said electrical resistance heater means, a positive input connected to the second end of said variable resistor means, and an output terminal;
said control means comprises a power transistor having base, collector and emitter electrodes and said base electrode connected to said output terminal of said differential amplifier, said collector electrode connected to the positive terminal of said source of direct current electrical energy and said emitter electrode connected to said second end of said first and said second fixed resistors, whereby for the condition of the temperature of said resistance heater means less than a predetermined value, said bridge is unbalanced and said differential amplifier provides an output signal to turn on said power transistor and allow electrical energy to flow from said source of direct current electrical energy to said bridge means, and the output of said differential amplifier drops to zero for the condition of said bridge means balanced thereby to turn off said power transistor.

6. The arrangement defined in claim 5, and further comprising:
a shunt resistor means connected across said connector electrode and said emitter electrode of said power transistor means to provide a shunt path for the flow of electrical energy from said source of direct current electrical energy to said bridge means for the condition of said transistor off.

7. The arrangement defined in claim 1, and further comprising:
said source of electrical energy comprises a source of alternating current electrical energy;
said detection means comprises a transformer having a primary winding connected to said second end of said heater means, and to said end of said variable resistor means, and a secondary winding, an alternating current amplifier having input terminals connected to said secondary winding; and a demodulator having an input terminal connected to an output terminal of said alternating current amplifier, and an output terminal connected to said control means and a reference terminal connected to said source of alternating current electrical energy, whereby said demodulator provides an output signal having a polarity depending upon the phase of the input signal from the alternating current amplifier relative to the phase of the reference signal from the alternating current energy source and having a magnitude proportional to the magnitude of said input signal to provide a control signal to said control device proportional to the balance condition of said bridge means.

8. The arrangement defined in claim 7, wherein:
said control means comprises a saturable reactor connected between said alternating current energy source and said second end of said first and said second fixed resistors for receiving said control signal from said demodulator and controlling the flow of electrical energy from said alternating current energy source in response to said control signal.

9. The arrangement defined in claim 7, wherein:
said control means comprises a saturable transformer connected between said alternating current energy source and said second end of said first and said second fixed resistors for receiving said control signal from said demodulator and controlling the flow of electrical energy from said alternating current energy source in response to said control signal.

10. The arrangement defined in claim 1, wherein:
said detection means comprises a differential integrator for providing a null balance on said bridge means for the condition of said bridge means balanced and providing an error signal for said balanced condition having a magnitude sufficient to match system losses.

11. The arrangement defined in claim 1 and further comprising:
said detection means comprises an alternating current amplifier for amplifying the signal flowing in said bridge means, a demodulator, having an input terminal connected to the output terminal of said alternating current amplifier, an output terminal connected to said control means and a reference signal terminal;
said source of electrical energy comprises a first source of direct current electrical energy for heating said electric resistance heater means and having a negative terminal connected to said first end of said heater means and said variable resistor means and a positive terminal connected to said control means, and a second source of alternating current electrical energy connected between said first ends of said heater means and said variable resistor means and said second ends of said first and said second fixed resistors and providing a reference signal to said reference terminal on said demodulator; and
said control means connected to said second ends of said first and said second fixed resistors whereby said control means controls the flow of direct current from said direct current electrical energy source to said bridge means in response to the magnitude of said output signal from said demodulator means.

12. The arrangement defined in claim 11, wherein:
said control means comprises a saturable reactor.

13. The arrangement defined in claim 11, wherein:
said control means comprises a saturable transformer.

14. The arrangement defined in claim 1 and further comprising:
said detection means comprises a transformer having a primary and a secondary winding and said primary winding connected between said second end of said heater means and said second end of said variable resistor means, an alternating current amplifier having a pair of inputs connected to said secondary winding of said transformer, and an output terminal, a demodulator having an input terminal connected to said output terminal of said alternating current amplifier, an output terminal connected to said control means and a reference signal terminal;

said source of electrical energy comprises a first source of direct current electrical energy and a second source of alternating current electrical energy said direct current source of electrical energy having a negative terminal connected to said first ends of said variable resistor and said heater means and a positive terminal connected to said second source of alternate current electrical energy, and said control means connected between said source of alternating current electrical energy and said second ends of said first and said second fixed resistors, and said reference terminal of said demodulator connected to said source of alternating current electrical energy to provide a reference signal thereto, whereby said first source of direct current electrical energy provides electrical energy to heat said heater means and said control means controls the flow of said direct current electrical energy to said bridge means in response to the magnitude of the output of said demodulator.

15. The arrangement defined in claim 14, wherein: said control means comprises a saturable transformer.

16. The arrangement defined in claim 14, wherein: said control means comprises a saturable transformer.

17. The arrangement defined in claim 1, wherein:
said detection means comprises a differential DC amplifier having a first input connected to said second end of said heater means and a second input connected to said second end of said variable resistor means and an output terminal for providing an output signal at said output terminal having a magnitude proportional to the difference between the magnitude of the signal at said first input terminal and said second input terminal;

said source of electrical energy comprises a first source of alternating current electrical energy for providing energy to heat said heater means connected to said first ends of said heater means and said variable resistor means;

said control means comprises a power transistor having base collector and emitter electrodes and said base electrode connected to said output terminal of said differential DC amplifier, said collector electrode connected to said source of alternating current electrical energy and said emitter electrode connected to said second ends of said first and said second fixed resistors; and said source of electrical energy further comprises a source of direct current electrical energy connected between said first ends of said heater means and said variable resistor means and said second ends of said first and said second fixed resistors.

18. The arrangement defined in claim 17 and further comprising:
a shunt resistor means connected between said collector electrode and said emitter electrode of said power transistor for providing a shunt path to bias said bridge means for the condition of said transistor means turned off.

19. The arrangement defined in claim 1 and further comprising:
said detection means comprises a differential DC amplifier having a first input connected to said second end of said heater means and a second input connected to said second end of said variable resistor, and an output terminal;

said source of electrical energy comprises a first source of alternating current electrical energy connected in series with a second source of direct current electrical energy and said source of alternating current electrical energy is connected to said first ends of said variable resistor and said heater means and to said second source of direct current electrical energy; and said control means comprises a transistor having base emitter and collector electrodes and said base electrode connected to said output terminal of said differential DC amplifier, said emitter electrode is connected to said second ends of said first and said second fixed resistor and collector electrode is connected to said source of direct current electrical energy whereby said first source of alternating current electrical energy supplied electrical energy for heating said heater means and said transistor controls the amount of said alternating current electrical energy flowing from said first source of alternating current electrical energy to said bridge means in response to the magnitude of the output signal from said differential DC amplifier.

20. The arrangement defined in claim 19 and further comprising:
a shunt resistor connected across said emitter terminal and said collector terminal of said transistor to provide a shunt path for biasing said bridge means for the condition of said transistor off.

21. The arrangement defined in claim 3 and further comprising:
said source of electrical energy comprises a source of alternating current electrical energy;

said detection means comprises an alternating current differential amplifier having a first input connected to said second end of said heater means, a second input connected to said second end of said variable resistor means, and an output, and a demodulator having an input terminal connected to said output terminal of said alternating current differential amplifier and an output terminal connected to said control means and a reference terminal connected to said source of alternating current electrical energy whereby said demodulator provides an output signal having a polarity depending upon the phase of the input signal from the alternating current differential amplifier relative to the phase of the reference signal from the alternating current energy source and having a magnitude proportional to the magnitude of said input signal to provide a control signal to said control device proportional to the balance condition of said bridge means.

22. The arrangement defined in claim 3 and further comprising:
said detection means comprises an alternating current differential amplifier having a first input connected to said second end of said heater means and a second input connected to said second end of said variable resistor means and an output terminal, a demodulator, having an input terminal connected to said output terminal of said alternating current differential amplifier, and output terminal connected to said control means and a reference terminal;

said source of electrical energy comprises a first source of direct current electrical energy for heating said electric resistance heater means and having a negative terminal connected to said first end of said heater means and said variable resistor means and a positive terminal connected to said control means, and a second source of alternating current electrical energy connected between said first ends of said heater means and said variable resistor means and said second ends of said first and said second fixed resistors and providing a reference signal to said reference terminal on said demodulator; and said control means connected to said second ends of said first and said second fixed resistors whereby said control means controls the flow of direct current from said direct current electrical energy source to said bridge means in response to the magnitude of said output signal from said demodulator means.

23. The arrangement defined in claim 3 and further comprising:

said detection means comprises a transformer having a primary and a secondary winding and said primary winding connected between said second end of said heater means and said second end of said variable resistor means, an alternating current amplifier having a pair of inputs connected to said secondary winding of said transformer, and an output terminal, a demodulator having an input terminal connected to said output terminal of said alternating current amplifier, an output terminal connected to said control means and a reference signal terminal;

said source of electrical energy comprises a first source of direct current electrical energy and a second source of alternating current electrical energy and said direct current source of electrical energy having a negative terminal connected to said first ends of said variable resistor and said heater means and a positive terminal connected to said second source of alternate current electrical energy, and said control means connected between said source of alternating current electrical energy and said second ends of said first and said second fixed resistors, and said reference terminal of said demodulator connected to said source of alternating current electrical energy to provide a reference signal thereto, whereby said first source of direct current electrical energy provides electrical energy to heat said heater means and said control means controls the flow of said direct current electrical energy to said bridge means in response to the magnitude of the output of said demodulator.

24. The arrangement defined in claim 4 and further comprising:

said detection means comprises a differential DC amplifier having a first input connected to said second end of said heater means and a second input connected to said second end of said variable resistor means and an output terminal for providing an output signal at said output terminal having a magnitude proportional to the difference between the magnitude of the signal at said first input terminal and said second input terminal;

said source of electrical energy comprises a first source of alternating current electrical energy for providing energy to heat said heater means connected to said first ends of said heater means and variable resistor means;

said control means comprises a power transistor having base collector and emitter electrodes and said base electrode connected to said output terminal of said differential DC amplifier, said collector electrode connected to said source of alternating current electrical energy and said emitter electrode connected to said second ends of said first and said second fixed resistors; and said source of electrical energy further comprises a source of direct current electrical energy connected between said first ends of said heater means and said variable resistor means and said second ends of said first and said second fixed resistors.

25. The arrangement defined in claim 4 and further comprising:

said detection means comprises a differential DC amplifier having a first input connected to said second end of said heater means and a second input connected to said second end of said variable resistor, and an output terminal;

said source of electrical energy comprises a first source of alternating current electrical energy connected in series with a second source of direct current electrical energy and said source of alternating current electrical energy is connected to said first ends of said variable resistor and said heater means and to said second source of direct current electrical energy; and said control means comprises a transistor having base emitter and collector electrodes and said base electrode connected to said output terminal of said differential DC amplifier, said emitter electrode is connected to said second ends of said first and said second fixed resistor and said collector electrode is connected to said source of direct current electrical energy whereby said first source of alternating current electrical energy supplied electrical energy for heating said heater means and said transistor controls the amount of said alternating current electrical energy flowing from said first source of alternating current electrical energy to said bridge means in response to the magnitude of the output signal from said differential DC amplifier.

References Cited

UNITED STATES PATENTS 2,528,446 10/1950 McConnell.
2,918,558 12/1959 Evans _____ 219—499

FOREIGN PATENTS 892,825 3/1962 Great Britain.

BERNARD A. GILHEANY, Primary Examiner

F. E. BELL, Assistant Examiner